(12) United States Patent
Wang et al.

(10) Patent No.: US 7,047,730 B2
(45) Date of Patent: May 23, 2006

(54) DE-SULFURIZATION OF A $NO_x$ ADSORBER CATALYST IN A DIESEL ENGINE EXHAUST SYSTEM

(75) Inventors: Xinlei Wang, Champaign, IL (US);
Patrick D. Barasa, Batavia, IL (US);
Justin M. O'Connor, Batavia, IL (US);
Shouxian Ren, Westland, MI (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 192 days.

(21) Appl. No.: 10/886,978

(22) Filed: Jul. 8, 2004

(65) Prior Publication Data

US 2006/0086085 A1    Apr. 27, 2006

(51) Int. Cl.
*F01N 3/00*    (2006.01)
(52) U.S. Cl. ............... 60/295; 60/274; 60/278; 60/286; 60/301
(58) Field of Classification Search .......... 60/274, 60/278, 286, 295, 300, 301, 303
See application file for complete search history.

(56) References Cited

U.S. PATENT DOCUMENTS

| | | | | |
|---|---|---|---|---|
| 5,974,791 | A * | 11/1999 | Hirota et al. | 60/276 |
| 6,164,064 | A | 12/2000 | Pott | |
| 6,269,634 | B1 * | 8/2001 | Yokota et al. | 60/286 |
| 6,615,580 | B1 * | 9/2003 | Khair et al. | 60/286 |

* cited by examiner

*Primary Examiner*—Thomas Denion
*Assistant Examiner*—Diem Tran
(74) *Attorney, Agent, or Firm*—Dennis Kelly Sullivan; Susan L. Lukasik; Jeffrey P. Calfa

(57) ABSTRACT

De-sulfurizing a $NO_x$ adsorber catalyst (48) without significantly increasing the temperature of exhaust gases leaving the engine exhaust manifold (42) by using a diesel oxidation catalyst (46) between the exhaust manifold and the $NO_x$ adsorber catalyst to elevate exhaust gas temperature entering the $NO_x$ adsorber catalyst to suitable de-sulfurizing temperature through control of certain aspects of engine operation (24, 28, 52).

31 Claims, 5 Drawing Sheets

DE-SULFURIZATION OF A $NO_X$ ADSORBER CATALYST IN A DIESEL ENGINE EXHAUST SYSTEM

FIELD OF THE INVENTION

This invention relates generally to diesel engines that have $NO_x$ adsorber catalysts for treating exhaust gases passing through their exhaust systems. More particularly, the invention relates to engine systems and methods for removing accumulation of sulfur from a $NO_x$ adsorber catalyst.

BACKGROUND OF THE INVENTION

An exhaust system of a diesel engine that comprises a $NO_x$ adsorber catalyst is capable of adsorbing substantial amounts of oxides of nitrogen ($NO_x$) in engine exhaust gases passing through the exhaust system from the engine. The $NO_x$ adsorber catalyst thereby reduces the amount of $NO_x$ entering the atmosphere, preventing the trapped $NO_x$ from contributing to what might otherwise become smog.

When a $NO_x$ adsorber catalyst is present in the exhaust system of a motor vehicle powered by a diesel engine, it is desirable to regenerate the $NO_x$ adsorber catalyst from time to time to remove captured $NO_x$ so that the catalyst can continue to be effective. Regeneration is typically performed only when prevailing conditions are suitable. The products of regeneration are non-pollutants that are naturally present in the atmosphere.

Naturally occurring petroleum typically contains sulfur in some amount and form, such as in sulfur compounds $SO_2$ and $SO_3$. It remains present to some degree in diesel fuel that results from the refinement of such petroleum. Because sulfur has the capability of poisoning a $NO_x$ adsorber catalyst, accumulations of sulfur in a $NO_x$ adsorber catalyst need to be removed before they begin to poison the catalyst. Even ultra-low sulfur diesel fuel (fuel having less than 15 ppm sulfur) contains levels of sulfur that are still high enough to collect in, and eventually begin to poison, a $NO_x$ adsorber catalyst. Regeneration of a $NO_x$ adsorber catalyst to remove adsorbed $NO_x$ is typically ineffective to also remove sulfur, and hence de-sulfurization is typically performed by a devoted procedure.

U.S. Pat. No. 6,164,064 describes a process for de-sulfurizing a $NO_x$ reservoir catalyst. The process is performed by operating the engine in a manner that elevates the exhaust gas temperature sufficiently to burn off accumulated sulfur, but not high enough to damage the $NO_x$ adsorber catalyst.

Typically, a diesel engine runs relatively lean and relatively cool compared to a gasoline engine. Operating a diesel engine in a manner that elevates exhaust gas temperature to levels needed to de-sulfurize a $NO_x$ adsorber catalyst is atypical to usual diesel engine operation. Moreover, if the engine is turbocharged, specifications pertaining to the turbocharger may impose an upper temperature limit on exhaust gases that pass through it.

It is believed that an engine, system, and method that can accomplish de-sulfurization of a $NO_x$ adsorber catalyst without increasing the temperature of exhaust gases leaving the engine exhaust manifold to those described in U.S. Pat. No. 6,164,064 would be a significant improvement, especially for a turbocharged diesel engine.

SUMMARY OF THE INVENTION

The present invention relates to engines, systems, and methods for de-sulfurizing a $NO_x$ adsorber catalyst without significantly increasing the temperature of exhaust gases leaving the engine exhaust manifold. In one example, the temperature of exhaust gases leaving the engine exhaust manifold increased only by about 50° C.

Principles of the invention include the use of a diesel oxidation catalyst between the exhaust manifold and the $NO_x$ adsorber catalyst. When the $NO_x$ adsorber catalyst is to be de-sulfurized, certain parameters relevant to engine operation are controlled in ways that utilize the DOC to elevate the temperature of exhaust gases coming from the exhaust manifold to temperature suitable for de-sulfurizing the $NO_x$ adsorber catalyst. The control proceeds in a manner that avoids increasing the de-sulfurization temperature to a level that would possibly begin to damage the $NO_x$ adsorber catalyst. At the conclusion of the de-sulfurization procedure, the de-sulfurization strategy relinquishes control over those parameters.

The parameters that are controlled in the disclosed embodiment include mass airflow into the engine, engine fueling, and exhaust gas recirculation (EGR).

In a turbocharged diesel engine, the turbine of the turbocharger is disposed between the exhaust manifold and the diesel oxidation catalyst thereby avoiding its exposure to the elevated temperatures created by the diesel oxidation catalyst during de-sulfurization.

Because control of the relevant engine operating parameters is performed by the existing the engine control system, the invention can be implemented in an engine having both a $NO_x$ adsorber catalyst and a diesel oxidation catalyst by suitable data programming and processing in the control system.

Accordingly, one generic aspect of the present invention relates to a method for de-sulfurizing a $NO_x$ adsorber catalyst in an exhaust system of a diesel engine that includes a diesel oxidation catalyst in upstream flow relation to the $NO_x$ adsorber catalyst. The method comprises a) controlling certain aspects of engine operation to cause the temperature of exhaust gases passing from the diesel oxidation catalyst to increase from a temperature range that is too low to cause de-sulfurization of the $NO_x$ adsorber catalyst to a de-sulfurization temperature range that is effective to de-sulfurize the $NO_x$ adsorber catalyst; and b) continuing controlling those aspects of engine operation to maintain the temperature of exhaust gases passing from the diesel oxidation catalyst within the de-sulfurization temperature range.

Another generic aspect relates to a control system for de-sulfurizing a $NO_x$ adsorber catalyst in an exhaust system of a diesel engine that includes a diesel oxidation catalyst in upstream flow relation to the $NO_x$ adsorber catalyst. The control system comprises a processor that processes certain data to control certain aspects of engine operation for performing the method just described.

Still another generic aspect relates to an engine having such a control system for performing the method as described.

One more aspect relates to a diesel engine comprising an exhaust system comprising a turbocharger turbine in upstream flow relationship to a $NO_x$ adsorber catalyst and a control system for repeatedly processing data values for certain operating parameters related to engine operation. The control system develops data values for certain controlling parameters that are effective to cause the temperature of exhaust gases entering the $NO_x$ adsorber catalyst to increase from a temperature range that is too low to cause de-sulfurization of the $NO_x$ adsorber catalyst to a de-sulfurization temperature range that is effective to de-sulfurize the $NO_x$ adsorber catalyst, and to maintain the temperature of exhaust gases entering the $NO_x$ adsorber catalyst within the de-sulfurization temperature range, while the temperature of exhaust gases passing through the turbocharger turbine is kept within the range that is too low to cause de-sulfurization of the $NO_x$ adsorber catalyst.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
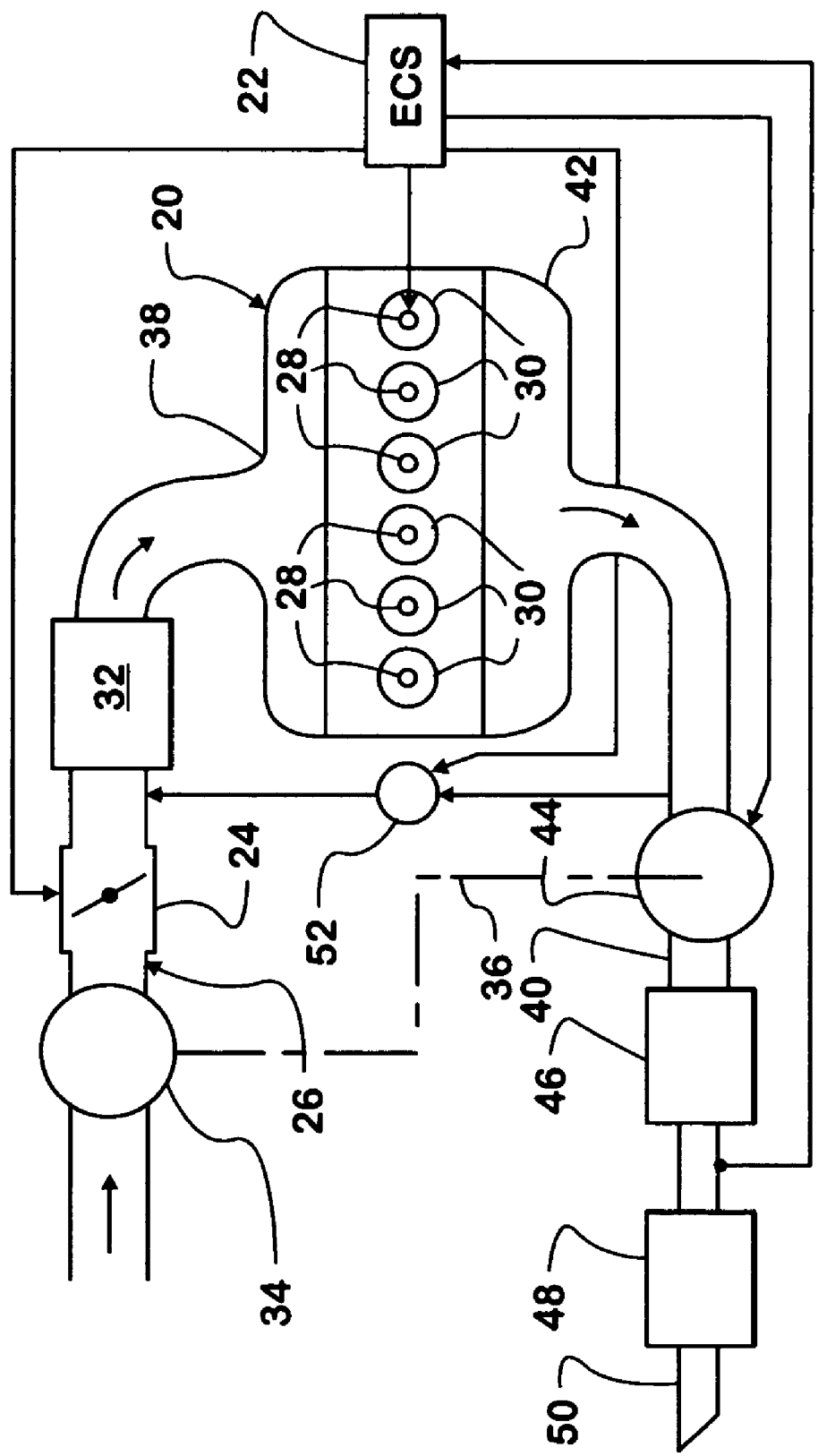
FIG. 1 is a general schematic diagram of portions of an exemplary diesel engine relevant to principles of the present invention.

FIG. 1 shows a schematic diagram of an exemplary diesel engine 20 for powering a motor vehicle. Engine 20 has a processor-based engine control system 22 that comprises one or more processors for processing data from various sources to develop various control data for controlling various aspects of engine operation. The data processed by control system 22 may originate at external sources, such as sensors, and/or be generated internally.

Control system 22 exercises control over various aspects of engine operation including mass airflow into the engine, engine fueling, and exhaust gas recirculation (EGR).

Intake mass airflow may be controlled by controlling an intake throttle 24 in the engine intake system 26.

Engine fueling may be controlled by controlling parameters related to the operation of electric-actuated fuel injectors 28 that inject fuel into engine combustion chambers 30, i.e. engine cylinders.

Engine intake system 26 further comprises an intercooler 32 and a compressor 34 of a turbocharger 36 in series, upstream of an engine intake manifold 38, as shown.

Engine 20 also comprises an exhaust system 40 through which exhaust gases created by combustion within engine cylinders 30 can pass from the engine to atmosphere. The exhaust system comprises an exhaust manifold 42 for conveyance of exhaust gases passing from each cylinder via one or more respective exhaust valves that open and close at proper times during engine cycles.

Turbocharger 36 further comprises a turbine 44 that is associated with exhaust system 40 and is coupled via a shaft to compressor 34. When control system 22 requests boost, turbocharging is performed by the action of hot exhaust gases on turbine 44 causing compressor 34 to impart boost to charge air that enters cylinders 30 via one or more respective intake valves that open and close at proper times during engine cycles.

Exhaust system 40 further comprises a diesel oxidation catalyst 46 downstream of turbine 44 and a $NO_x$ adsorber catalyst 48 downstream of diesel oxidation catalyst 46. The two catalysts treat exhaust gases before they pass into the atmosphere through a tailpipe 50.

Diesel oxidation catalyst 46 performs a function of oxidizing hydrocarbons (HC) in the incoming exhaust gas to $CO_2$ and $H_2O$. $NO_x$ adsorber catalyst 48 performs a function of adsorbing oxides of nitrogen.

Exhaust gas recirculation (EGR) is performed by control system 22 controlling an EGR valve 52 that controls a quantity of exhaust gas recirculated from exhaust system 40 to intake system 26. Alternatively, exhaust gas recirculation could be performed internally of the engine as iEGR by control of valve timing if the engine is equipped with a variable valve timing (VVT) system.

Figure 2:
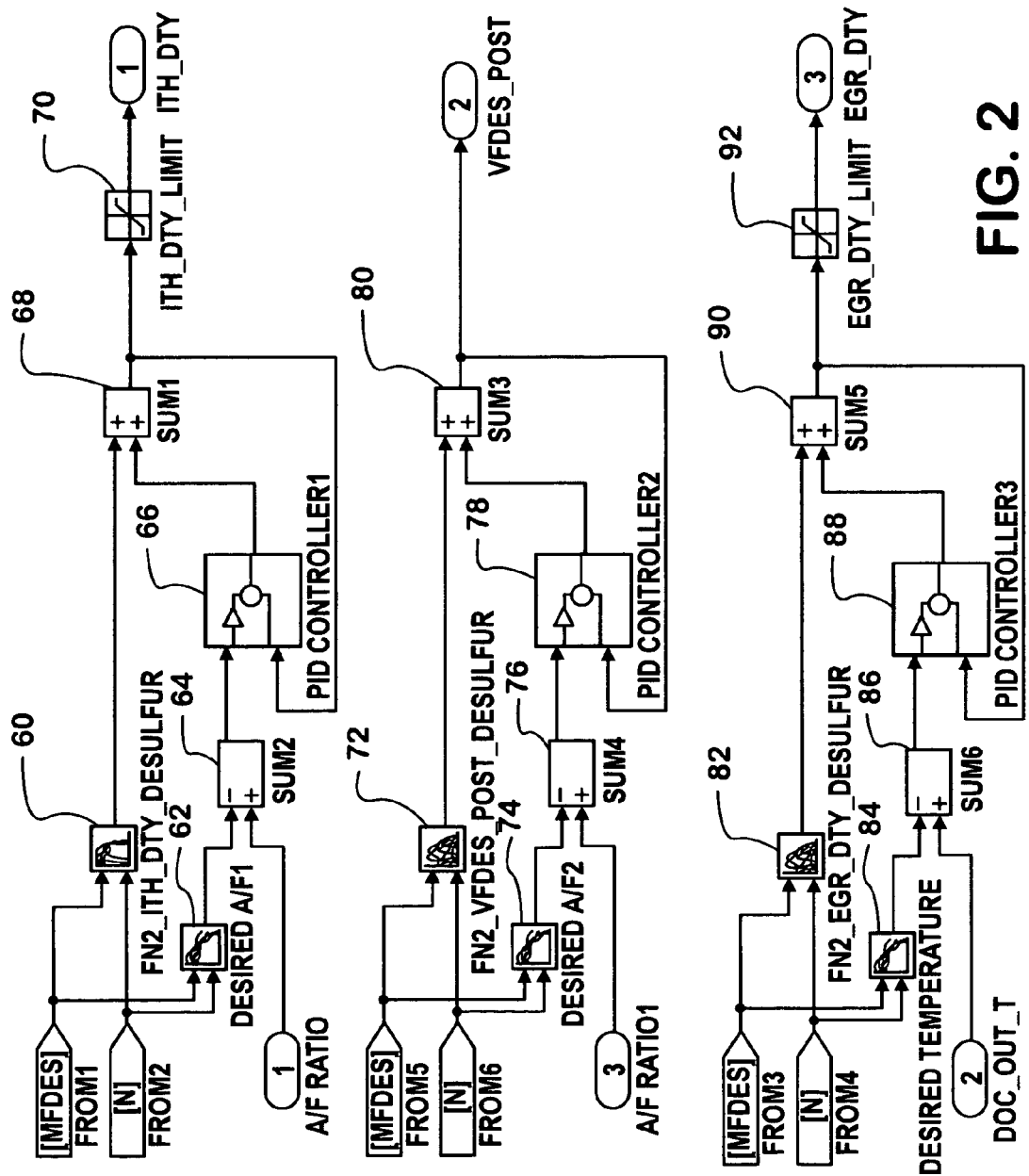
FIG. 2 is a software strategy diagram of an exemplary implementation of the inventive strategy in the engine control system of FIG. 1.

The diagram of FIG. 2 will show that the inventive de-sulfurization strategy involves control of air-fuel (A/F) ratio and of exhaust gas temperature. Briefly, when execution of the strategy is appropriate, the strategy commences by controlling certain aspects of engine operation to cause the temperature of exhaust gases passing from diesel oxidation catalyst 46 to increase from a temperature range that is too low to cause de-sulfurization of $NO_x$ adsorber catalyst 48 to a de-sulfurization temperature range that is effective to de-sulfurize the $NO_x$ adsorber catalyst. The strategy continues controlling those aspects of engine operation to maintain the temperature of exhaust gases passing from diesel oxidation catalyst 46 within the de-sulfurization temperature range until the execution of the strategy concludes, either because the procedure has removed substantially all the sulfur compounds from catalyst 48 or because some other reason makes it appropriate to discontinue the procedure.

The strategy comprises control system 22 processing data indicative of engine speed N and data indicative of engine load MFDES. In a diesel engine, the quantity of fuel being injected into each cylinder 30 (MFDES) by the corresponding fuel injector 28 is considered indicative of engine load. Any other data source that is indicative of engine load could provide an alternate and equivalent data input for control system 22.

Principles of the invention involve using diesel oxidation catalyst 46 to elevate the temperature of exhaust gases coming from exhaust manifold 42 to temperature suitable for de-sulfurizing the $NO_x$ adsorber catalyst without increasing the de-sulfurization temperature to a level that would possibly begin to damage the $NO_x$ adsorber catalyst. By using diesel oxidation catalyst 46 to elevate exhaust gas temperature, the temperature of exhaust gases leaving exhaust manifold 42 can be kept relatively cooler than would otherwise be the case, a definite benefit for engine operation and for turbocharger operation. The in-cylinder combustion process should be controlled in a manner that limits the temperature of exhaust gases entering the turbine of the turbocharger so that it doesn't exceed the maximum temperature limit for the particular turbocharger. With proper control of air and fuel, the catalytic action of the diesel oxidation catalyst will elevate exhaust gas temperature even further to a temperature suitable for de-sulfurization of the $NO_x$ adsorber catalyst without exceeding maximum temperature limits for both catalysts.

The strategy develops data values for certain controlling parameters, ITH_DTY, VFDES_post, and EGR_DTY in the disclosed embodiment. ITH_DTY sets the duty cycle of a pulse-width-modulated (PWM) signal that is applied to a solenoid that operates intake throttle 24. The data value for ITH_DTY sets the extent to which intake throttle 24 restricts airflow through intake system 26. VFDES_post sets the quantity of fuel that is injected by each fuel injector 28 as a post-injection fuel pulse after the fuel injector has delivered a main fueling injection (MFDES). EGR_DTY sets the quantity of exhaust gas that is recirculated in engine 20 by setting the duty cycle of a PWM signal that operates a solenoid to set the extent to which EGR valve 52 opens.

The portion of the strategy that develops data values for ITH_DTY comprises two maps, or look-up tables, 60, 62. Map 60 contains data values useful in developing a data value for ITH_DTY. Each such data value in map 60 is correlated with a respective set of data values for MFDES and N. Each data value for MFDES in the map represents a corresponding fractional span of a range of engine loads while each data value for N in the map represents a corresponding fractional span of a range of engine speeds. For any given combination of actual data values for MFDES and N, the actual data value for MFDES will fall within one of the fractional spans for MFDES in map 60, and the actual data value for N will fall within one of the fractional spans for N in the map, causing the data value in the map that correlates with the two respective fractional spans to be supplied as the data output of map 60.

Similarly, map 62 contains data values useful in developing the data value for a parameter Desired_A/F1. Each data value for Desired_A/F1 in map 62 is correlated with a respective set of data values for MFDES and N. Each data value for MFDES in the map represents a corresponding fractional span of a range of engine loads while each data value for N in the map represents a corresponding fractional span of a range of engine speeds. For any given combination of actual data values for MFDES and N, the actual data value for MFDES will fall within one of the fractional spans for MFDES in map 62, and the actual data value for N will fall within one of the fractional spans for N in the map, causing the data value for Desired_A/F1 that correlates with the two respective fractional spans to be supplied as the data output of map 62.

Desired_A/F1 is a parameter that represents a desired A/F ratio at which engine 20 should operate as the de-sulfurization strategy executes. The data value for Desired_A/F1 forms one input to an algebraic summing function 64. The other input to summing function 64 is the data value for actual A/F ratio at which engine 20 is operating, a data value that can be obtained in any suitably appropriate way, such as from a lambda sensor (not specifically shown in FIG. 1) at a suitable location in exhaust system 40. The actual A/F ratio is obviously related to the actual mass airflow, and hence is a suitable parameter for feedback control of intake throttle 24.

The data value from map 62 forms a command input to summing function 64, and the data value for A/F ratio forms a feedback input. Algebraic summing function 64 effectively takes the difference between the two inputs, yielding an error data value, a data value that is further processed to develop the data value for ITH_DTY.

The processor of control system 22 processes the error data value from summing function 64 according to a PID control function 66 and then applies a summing function 68 that sums a data value resulting from processing of the error data value by PID control function 66 and the data value from map 60 to yield a data value for ITH_DTY. The data value for ITH_DTY also forms a feedback input to PID control function 66. A min-max limiting function 70 assures that the data value for ITH_DTY that is ultimately used to control intake throttle 24 will be neither greater than a defined maximum nor less than a defined minimum.

The control strategy for developing data values for ITH_DTY uses a combination of feed-forward and feedback control principles. The data value from map 60 is essentially a feed-forward command intended to cause fast response to changes in engine speed and/or engine load that cause the data value from map 60 to change. The feedback of the data value for actual A/F ratio forms a major feedback loop while the feedback of the data value output of summing function 68 to PID control function 66 forms a minor feedback loop.

The portion of the strategy that develops data values for VFDES_post comprises two maps, or look-up tables, 72, 74. Map 72 contains data values useful in developing a data value for VFDES_post. Each such data value in map 72 is correlated with a respective set of data values for MFDES and N. Each data value for MFDES in the map represents a corresponding fractional span of a range of engine loads while each data value for N in the map represents a corresponding fractional span of a range of engine speeds. For any given combination of actual data values for MFDES and N, the actual data value for MFDES will fall within one of the fractional spans for MFDES in map 72, and the actual data value for N will fall within one of the fractional spans for N in the map, causing the data value in the map that correlates with the two respective fractional spans to be supplied as the data output of map 72.

Similarly, map 74 contains data values useful in developing the data value for a parameter Desired_A/F2. Each data value for Desired_A/F2 in map 74 is correlated with a respective set of data values for MFDES and N. Each data value for MFDES in the map represents a corresponding fractional span of a range of engine loads while each data value for N in the map represents a corresponding fractional span of a range of engine speeds. For any given combination of actual data values for MFDES and N, the actual data value for MFDES will fall within one of the fractional spans for MFDES in map 74, and the actual data value for N will fall within one of the fractional spans for N in the map, causing the data value for Desired_A/F2 that correlates with the two respective fractional spans to be supplied as the data output of map 74.

Desired_A/F2 is a parameter that like Desired_AF1 also represents a desired A/F ratio at which engine 20 should operate as the de-sulfurization strategy executes. The data value for Desired_A/F2 forms one input to an algebraic summing function 76. The other input to summing function 76 is the data value for actual A/F ratio at which engine 20 is operating, a data value that can be obtained in any suitably appropriate way. The actual A/F ratio is obviously related to actual engine fueling, and hence is a suitable parameter for feedback control of post-injection fueling.

The data value from map 74 forms a command input to summing function 76, and the data value for A/F ratio forms a feedback input. Algebraic summing function 76 effectively takes the difference between the two inputs, yielding an error data value, a data value that is further processed to develop the data value for VFDES_post.

The processor of control system 22 processes the error data value from summing function 76 according to a PID control function 78 and then applies a summing function 80 that sums a data value resulting from processing of the error data value by PID control function 78 and the data value from map 72 to yield a data value for VFDES_post. The data value for VFDES_post also forms a feedback input to PID control function 78.

Like the control strategy for developing data values for ITH_DTY, the control strategy for developing data values for VFDES_post uses a combination of feed-forward and feedback control principles. Collectively, control of mass airflow into engine 20 by control of intake throttle 24 via ITH_DES and control of post-injection fueling by control of fuel injectors 28 via VFDES_post are effective to control actual A/F ratio, making use of the data value for actual A/F ratio suitable for major loop feedback, as described.

The portion of the strategy that develops data values for EGR_DTY comprises two maps, or look-up tables, 82, 84. Map 82 contains data values useful in developing a data value for EGR_DTY. Each such data value in map 82 is correlated with a respective set of data values for MFDES and N. Each data value for MFDES in the map represents a corresponding fractional span of a range of engine loads while each data value for N in the map represents a corresponding fractional span of a range of engine speeds. For any given combination of actual data values for MFDES and N, the actual data value for MFDES will fall within one of the fractional spans for MFDES in map 82, and the actual data value for N will fall within one of the fractional spans for N in the map, causing the data value in the map that correlates with the two respective fractional spans to be supplied as the data output of map 82.

Similarly, map 84 contains data values useful in developing the data value for a parameter Desired_Temperature. Each data value for Desired_Temperature in map 84 is correlated with a respective set of data values for MFDES and N. Each data value for MFDES in the map represents a corresponding fractional span of a range of engine loads while each data value for N in the map represents a corresponding fractional span of a range of engine speeds. For any given combination of actual data values for MFDES and N, the actual data value for MFDES will fall within one of the fractional spans for MFDES in map 84, and the actual data value for N will fall within one of the fractional spans for N in the map, causing the data value for Desired_Temperature that correlates with the two respective fractional spans to be supplied as the data output of map 84.

Desired_Temperature is a parameter that represents a desired temperature for exhaust gases that pass from diesel oxidation catalyst 46 as the de-sulfurization strategy executes. The data value for Desired_Temperature forms one input to an algebraic summing function 86. The other input to summing function 86 is the data value for actual exhaust gas temperature (DOC_out_T) at the outlet of diesel oxidation catalyst 46, a data value that can be obtained in any suitably appropriate way such as from a temperature probe at that location.

The data value from map 84 forms a command input to summing function 86, and the data value for DOC_out_T forms a feedback input. Algebraic summing function 86 effectively takes the difference between the two inputs, yielding an error data value, a data value that is further processed to develop the data value for EGR_DTY.

The processor of control system 22 processes the error data value from summing function 86 according to a PID control function 88 and then applies a summing function 90 that sums a data value resulting from processing of the error data value by PID control function 88 and the data value from map 82 to yield a data value for EGR_DTY. The data value for EGR_DTY also forms a feedback input to PID control function 88. A min-max limiting function 90 assures that the data value for EGR_DTY that is ultimately used to control EGR valve 52 will be neither greater than a defined maximum nor less than a defined minimum. Like the control strategies for developing data values for ITH_DTY and for VFDES_post, the control strategy for developing data values for EGR_DTY uses a combination of feed-forward and feedback control principles.

Effective removal of sulfur components from a known $NO_x$ adsorber catalyst can occur when temperatures are in a range of about 650° C. to about 750° C. Effective de-sulfurization in one diesel engine was performed by running the engine at a speed of substantially 1500 rpm (revolutions per minute) and a load of substantially 210 foot-pounds torque. With the engine running lean prior to the beginning of the de-sulfurization procedure, airflow and fueling were controlled to decrease the A/F ratio to slightly richer than stoichiometric, substantially about 13, and then to maintain that ratio. Oxygen ($O_2$) content in the exhaust was also decreased by controlling EGR.

Consequently, the effectiveness of the diesel oxidation catalyst generated additional heating of the exhaust gases passing through it, elevating the temperature of the exhaust gases passing from the diesel oxidation catalyst to temperatures high enough to reach the range for de-sulfurizing the $NO_x$ adsorber catalyst. Control of oxygen content via EGR control is important in controlling the temperature of the exhaust gases passing from the diesel oxidation catalyst to maintain de-sulfurization temperatures within a suitable range between low and high limits. When exhaust gases passing from the diesel oxidation catalyst reach about 650° C. and are maintained substantially at that temperature, they are effective to create temperatures within a range of 650° C.–750° C. within the $NO_x$ adsorber catalyst. This occurs without any similar sort of increase in the temperature of the exhaust gases coming out of the engine exhaust manifold. For example, a temperature rise of about 50° C. would be typical.

Figure 3:
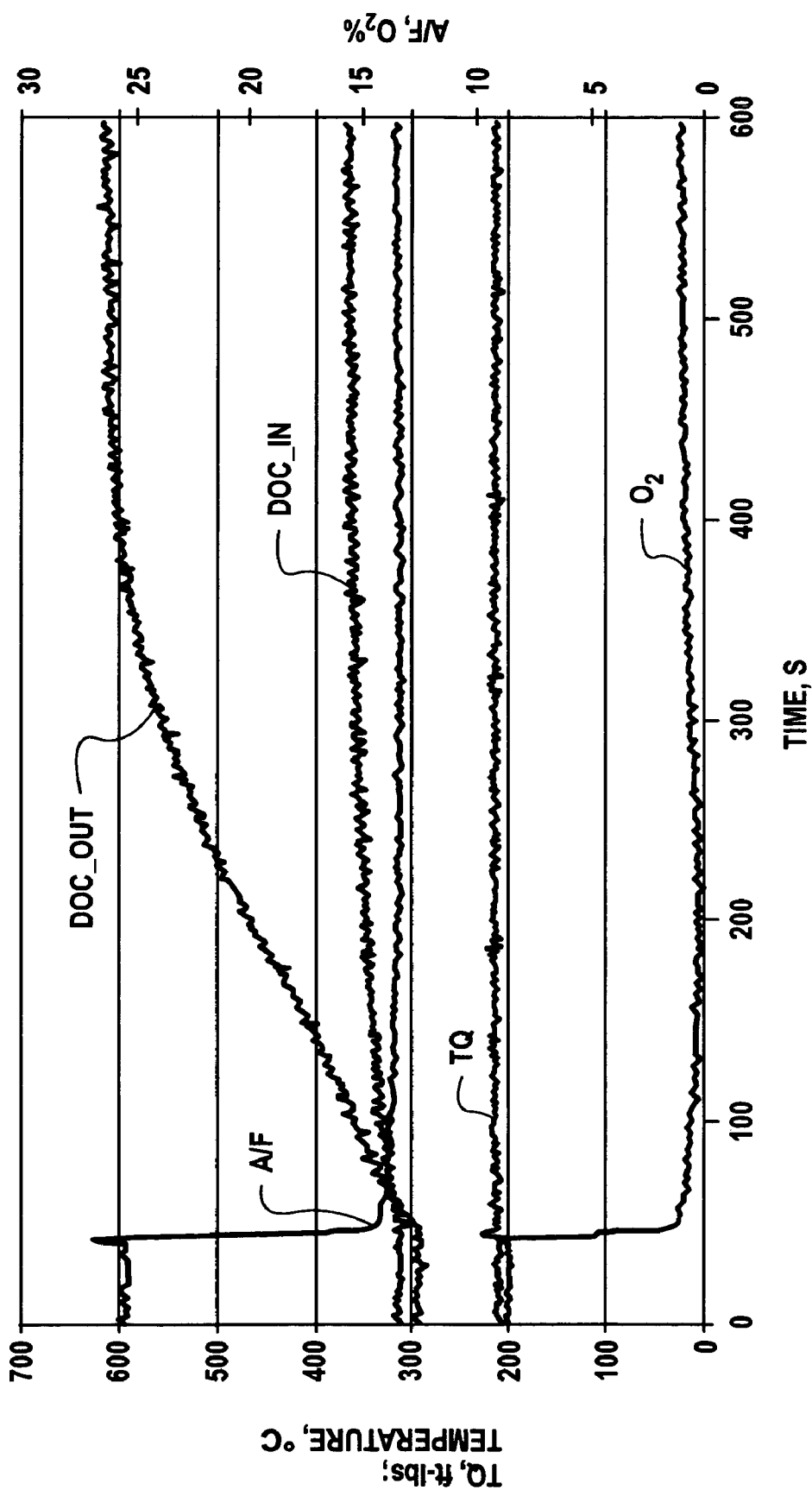
FIG. 3 is a graph plot showing time traces of certain parameters relevant to an example of de-sulfurization procedure in accordance with the invention.
Figure 4:
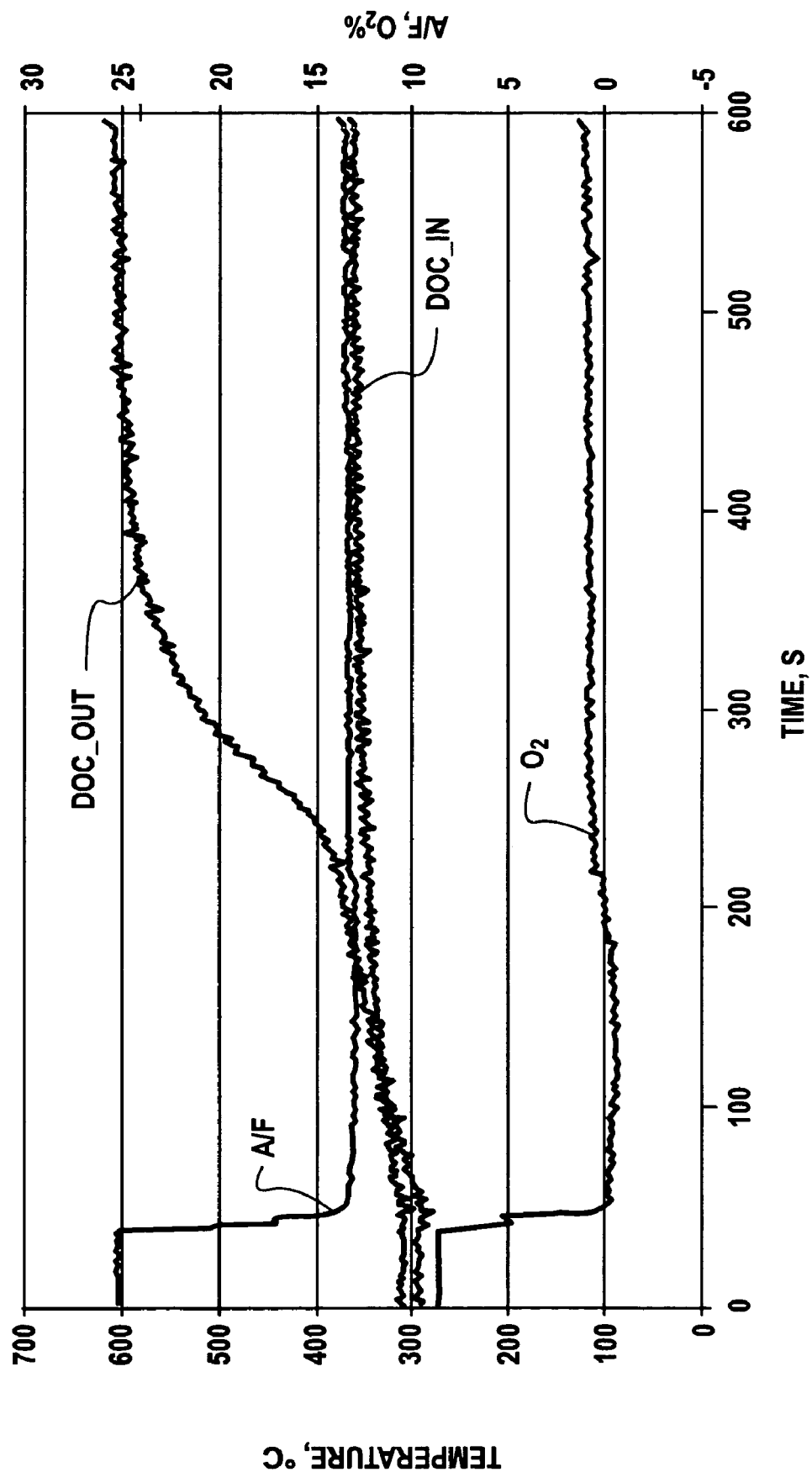
FIG. 4 is another graph plot.
Figure 5:
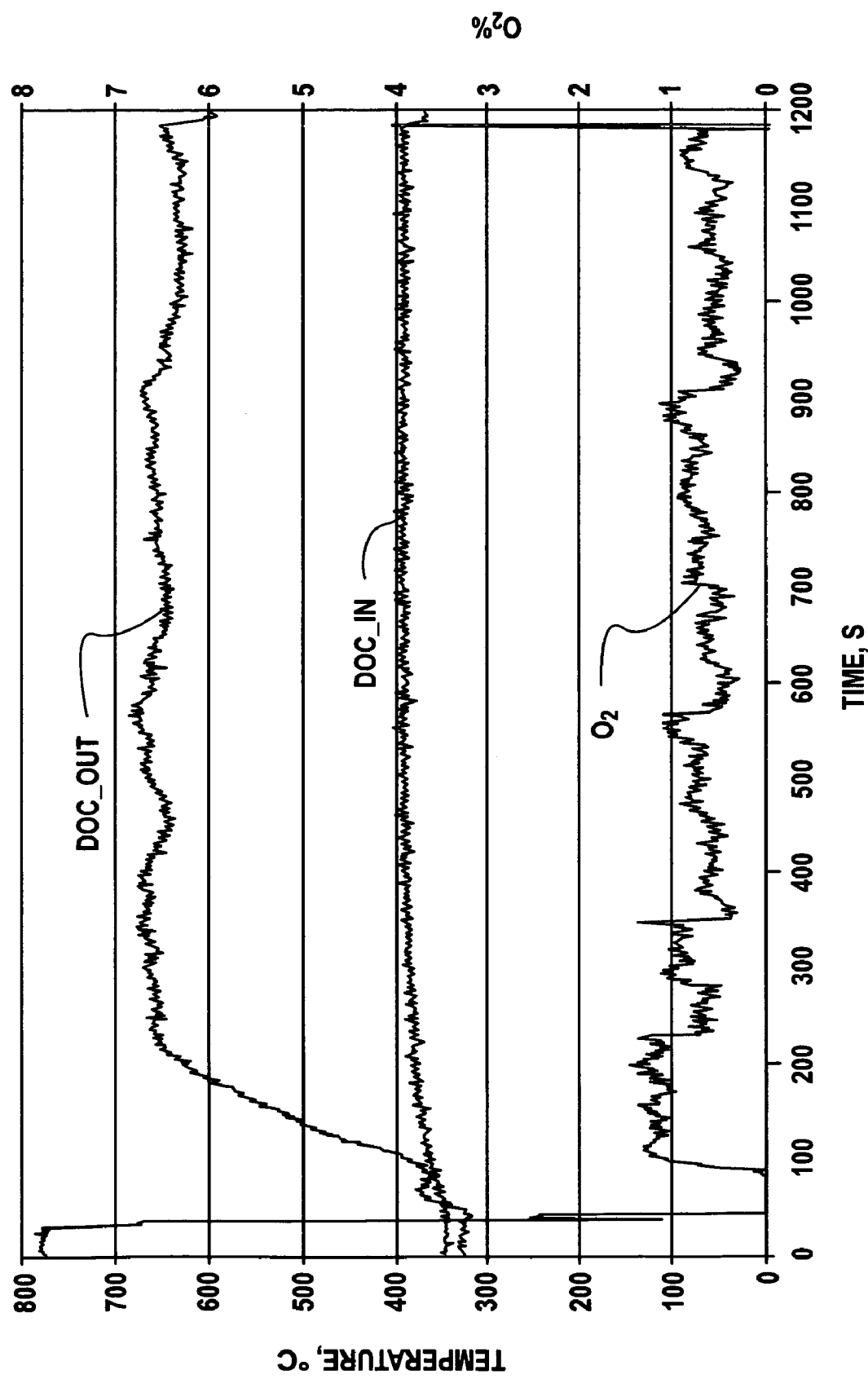
FIG. 5 is still another graph plot.

Examples of this are portrayed in the traces shown in FIGS. 3–5. Once the temperature of exhaust gases passing from the diesel oxidation catalyst has reached about 650° C. (a rise of over 200° C.), that temperature is substantially maintained by the described strategy. The rise in temperature at the inlet of the diesel oxidation catalyst is significantly less (about 50° C.), and should not exceed substantially 450° C.

While a presently preferred embodiment of the invention has been illustrated and described, it should be appreciated that principles of the invention apply to all embodiments falling within the scope of the following claims.

What is claimed is:

1. A method for de-sulfurizing a $NO_x$ adsorber catalyst in an exhaust system of a diesel engine that includes a diesel oxidation catalyst in upstream flow relation to the $NO_x$ adsorber catalyst, the method comprising:
   a) controlling certain aspects of engine operation to cause the temperature of exhaust gases passing from the diesel oxidation catalyst to increase from a temperature range that is too low to cause de-sulfurization of the $NO_x$ adsorber catalyst to a de-sulfurization temperature range that is effective to de-sulfurize the $NO_x$ adsorber catalyst; and
   b) continuing controlling those aspects of engine operation to maintain the temperature of exhaust gases passing from the diesel oxidation catalyst within the de-sulfurization temperature range;
   wherein steps a) and b) collectively comprise controlling the relationship between engine fueling and mass airflow through an intake system of the engine to cause the engine to operate at a desired air-fuel ratio slightly richer than stoichiometric by closed-loop controlling both an intake throttle that selectively restricts airflow passing through the intake system and post-injection fueling that occurs after a main fuel injection, and step b) further comprises maintaining the temperature of exhaust gases passing from the diesel oxidation catalyst within the de-sulfurization temperature range by closed-loop controlling the quantity of engine exhaust gas being recirculated through the engine.

2. A method as set forth in claim 1 wherein steps a) and b) collectively comprise controlling those certain aspects of engine operation so as to cause the temperature of exhaust gases passing through the diesel oxidation catalyst to eventually increase by at least 200° C. during passage through the diesel oxidation catalyst.

3. A method as set forth in claim 1 wherein steps a) and b) collectively comprise controlling those certain aspects of engine operation so as to limit the maximum temperature of exhaust gases entering the diesel oxidation catalyst to about 450° C.

4. A method as set forth in claim 1 wherein steps a) and b) collectively comprise processing data indicative of engine speed and data indicative of engine load to set a data value for desired air-fuel ratio for closed-loop controlling the intake throttle, a data value for desired air-fuel ratio for closed-loop controlling the post-injection fueling, and a data value for a temperature within the de-sulfurization temperature range for closed-loop controlling the quantity of engine exhaust gas being recirculated through the engine.

5. A control system for de-sulfurizing a $NO_x$ adsorber catalyst in an exhaust system of a diesel engine that includes a diesel oxidation catalyst in upstream flow relation to the $NO_x$ adsorber catalyst, the control system comprising a processor:
   a) for repeatedly processing data values for certain operating parameters related to engine operation to develop data values for certain controlling parameters that are effective to cause the temperature of exhaust gases passing from the diesel oxidation catalyst to increase from a temperature range that is too low to cause de-sulfurization of the $NO_x$ adsorber catalyst to a de-sulfurization temperature range that is effective to de-sulfurize the $NO_x$ adsorber catalyst; and
   b) for continuing processing data values for those certain operating parameters to develop data values for those certain controlling parameters that are effective to maintain the temperature of exhaust gases passing from the diesel oxidation catalyst within the de-sulfurization temperature range;
   wherein the processor's processing of data values for certain operating parameters comprises processing data values indicative of engine speed and of engine load; and further including
   a map containing data values useful in developing a data value for one of those certain controlling parameters, each such data value in the map being correlated with a respective set of data values indicative of engine speed and of engine load, and
   wherein the processor's processing of data values for certain operating parameters comprises processing data values of actual engine speed and actual engine load to select from the map a corresponding data value useful in developing a data value for the one controlling parameter, and
   the processor uses the data value selected from the map in further processing that develops the data value for the one controlling parameter
   including
   a further map containing data values useful in developing the data value for the one controlling parameter, each such data value in the further map being correlated with a respective set of data values indicative of engine speed and of engine load, and
   wherein the processor processes, as a command input, the data value selected from the further map, and as a feedback input, a data value related to the actual data value of a parameter controlled by the one controlling parameter to develop an error data value, and the processor also uses the error data value in the further processing that develops the data value for the one controlling parameter.

6. A control system as set forth in claim 5 wherein the processor's processing of those certain operating parameters develops data values for those certain controlling parameters that are effective to cause the temperature of exhaust gases passing through the diesel oxidation catalyst to eventually increase by at least 200° C. during passage through the diesel oxidation catalyst.

7. A control system as set forth in claim 5 wherein the processor's processing of those certain operating parameters develops data values for those certain controlling parameters that are effective to limit the maximum temperature of exhaust gases entering the diesel oxidation catalyst to about 450° C.

8. A control system as set forth in claim 5 wherein the processor's processing of those certain operating parameters develops data values for those certain controlling parameters that are effective to control the relationship between engine fueling and mass airflow through an intake system of the engine to cause the engine to operate at a desired air-fuel ratio slightly richer than stoichiometric.

9. A control system as set forth in claim 8 wherein one of those certain controlling parameters comprises a parameter for controlling post-injection fueling that occurs after a main fuel injection.

10. A control system as set forth in claim 8 wherein one of those certain controlling parameters comprises a parameter for controlling an intake throttle that selectively restricts airflow passing through the intake system.

11. A control system as set forth in claim 8 wherein one of those certain controlling parameters comprises a parameter for controlling the quantity of engine exhaust gas being recirculated through the engine.

12. A control system as set forth in claim 5 wherein the processor processes the error data value according to a PID control function and then algebraically sums a data value resulting from processing of the error data value by the PID control function and the data value selected from the first-mentioned map to yield the data value for the one controlling parameter, while using the data value for the one controlling parameter as feedback to the PID control function.

13. A control system as set forth in claim 12 wherein the parameter controlled by the one controlling parameter comprises mass airflow through the intake system, and the data value related to the actual data value of a parameter controlled by the one controlling parameter is indicative of air-fuel ratio at which the engine is operating.

14. A control system as set forth in claim 12 wherein the parameter controlled by the one controlling parameter comprises post-injection fueling that occurs after a main fuel injection, and the data value related to the actual data value of a parameter controlled by the one controlling parameter is indicative of air-fuel ratio at which the engine is operating.

15. A control system as set forth in claim 12 wherein the parameter controlled by the one controlling parameter comprises the quantity of engine exhaust gas being recirculated through the engine, and the data value related to the actual data value of a parameter controlled by the one controlling parameter is indicative of temperature of exhaust gases passing from the diesel oxidation catalyst.

16. A diesel engine comprising:
an exhaust system comprising a diesel oxidation catalyst in upstream flow relationship to a $NO_x$ adsorber catalyst; and a control system for controlling de-sulfurization of the $NO_x$ adsorber catalyst by
a) controlling certain aspects of engine operation to cause the temperature of exhaust gases passing from the diesel oxidation catalyst to increase from a temperature range that is too low to cause de-sulfurization of the $NO_x$ adsorber catalyst to a de-sulfurization temperature range that is effective to de-sulfurize the $NO_x$ adsorber catalyst, and
b) continuing controlling those aspects of engine operation to maintain the temperature of exhaust gases passing from the diesel oxidation catalyst within the de-sulfurization temperature range,
wherein the control system comprises a processor for processing data and a map containing data values useful in developing a data value for one of those certain controlling parameters, each such data value in the map being correlated with a respective set of data values indicative of engine speed and of engine load, and the processor processes data indicative of actual engine speed and data indicative of actual engine load to select from the map a corresponding data value useful in developing a data value for the one controlling parameter, and the processor uses the data value selected from the map in further processing that develops the data value for the one controlling parameter
wherein the control system comprises a further map containing data values useful in developing the data value for the one controlling parameter, each such data value in the further map being correlated with a respective set of data values indicative of engine speed and of engine load, and
wherein the processor processes, as a command input, the data value selected from the further map, and as a feedback input, a data value related to the actual data value of a parameter controlled by the one controlling parameter to develop an error data value, and the processor also uses the error data value in the further processing that develops the data value for the one controlling parameter.

17. An engine as set forth in claim 16 wherein the control system is effective to control those certain aspects of engine operation so as to cause the temperature of exhaust gases passing through the diesel oxidation catalyst to eventually increase by at least 200° C. during passage through the diesel oxidation catalyst.

18. An engine as set forth in claim 16 wherein the control system is effective to control those certain aspects of engine operation so as to limit the maximum temperature of exhaust gases entering the diesel oxidation catalyst to about 450° C.

19. An engine as set forth in claim 16 wherein the processor processes data indicative of engine speed and data indicative of engine load to set a data value for desired air-fuel ratio for closed-loop controlling the intake throttle, a data value for desired air-fuel ratio for closed-loop controlling the post-injection fueling, and a data value for a temperature within the de-sulfurization temperature range for closed-loop controlling the quantity of engine exhaust gas being recirculated through the engine.

20. An engine as set forth in claim 16 further including a turbocharger for turbocharging the engine comprising a turbine in upstream flow relationship to the diesel oxidation catalyst in the exhaust system.

21. An engine as set forth in claim 16 wherein the engine further comprises an intake system, and the control system is effective to control the relationship between engine fueling and mass airflow through the intake system to cause the engine to operate at a desired air-fuel ratio slightly richer than stoichiometric.

22. An engine as set forth in claim 21 wherein the control system is effective to control the relationship between engine fueling and mass airflow through the intake system to cause the engine to operate at a desired air-fuel ratio slightly richer than stoichiometric by controlling post-injection fueling that occurs after a main fuel injection.

23. An engine as set forth in claim 22 wherein the intake system comprises an intake throttle for selectively restricting airflow through the intake system, and the control system is effective to control the relationship between engine fueling and mass airflow through the intake system to cause the engine to operate at a desired air-fuel ratio slightly richer than stoichiometric by controlling the intake throttle.

24. An engine as set forth in claim 23 wherein the control system is effective to control the relationship between engine fueling and mass airflow through the intake system to cause the engine to operate at a desired air-fuel ratio slightly richer than stoichiometric by closed-loop controlling both the intake throttle and the post-injection fueling, and to maintain the temperature of exhaust gases passing from the diesel oxidation catalyst within the de-sulfurization temperature range by closed-loop controlling the quantity of engine exhaust gas being recirculated through the engine.

25. An engine as set forth in claim 21 wherein the control system is effective to maintain the temperature of exhaust gases passing from the diesel oxidation catalyst within the de-sulfurization temperature range by closed-loop controlling the quantity of engine exhaust gas being recirculated through the engine.

26. An engine as set forth in claim 16 wherein the processor processes the error data value according to a PID control function and then algebraically sums a data value resulting from processing of the error data value by the PID control function and the data value selected from the first-mentioned map to yield the data value for the one controlling parameter, while using the data value for the one controlling parameter as feedback to the PID control function.

27. An engine as set forth in claim 26 wherein the parameter controlled by the one controlling parameter comprises mass airflow through the intake system, and the data value related to the actual data value of a parameter controlled by the one controlling parameter is indicative of air-fuel ratio at which the engine is operating.

28. An engine as set forth in claim 26 wherein the parameter controlled by the one controlling parameter comprises post-injection fueling that occurs after a main fuel injection, and the data value related to the actual data value of a parameter controlled by the one controlling parameter is indicative of air-fuel ratio at which the engine is operating.

29. An engine as set forth in claim 26 wherein the parameter controlled by the one controlling parameter comprises the quantity of engine exhaust gas being recirculated through the engine, and the data value related to the actual data value of a parameter controlled by the one controlling parameter is indicative of temperature of exhaust gases passing from the diesel oxidation catalyst.

30. A diesel engine comprising:
an exhaust system comprising a turbocharger turbine in upstream flow relationship to a $NO_x$ adsorber catalyst; and a control system for repeatedly processing data values for certain operating parameters related to engine operation to develop data values for certain controlling parameters that are effective to cause the temperature of exhaust gases entering the $NO_x$ adsorber catalyst to increase from a temperature range that is too low to cause de sulfurization of the $NO_x$ adsorber catalyst to a de-sulfurization temperature range that is effective to de-sulfurize the $NO_x$ adsorber catalyst, and to maintain the temperature of exhaust gases entering the $NO_x$ adsorber catalyst within the de-sulfurization temperature range, while the temperature of exhaust gases passing through the turbocharger turbine is kept within the range that is too low to cause de-sulfurization of the $NO_x$ adsorber catalyst.

31. An engine as set forth in claim 30 wherein the control system is effective to limit the maximum temperature of exhaust gases passing through the turbocharger turbine to about 450° C. while de-sulfurization of the $NO_x$ adsorber catalyst is occurring.

* * * * *